US011136905B2

(12) United States Patent
Grelet

(10) Patent No.: US 11,136,905 B2
(45) Date of Patent: Oct. 5, 2021

(54) RANKINE POWER SYSTEM WITH WORKING FLUID TANK AND CONTROL SYSTEM

(71) Applicant: Tenneco GmbH, Edenkoben (DE)

(72) Inventor: Vincent Grelet, Landau in der Pfalz (DE)

(73) Assignee: Tenneco GmbH, Edenkoben (DE)

( * ) Notice: Subject to any disclaimer, the term of this patent is extended or adjusted under 35 U.S.C. 154(b) by 603 days.

(21) Appl. No.: 15/973,993

(22) Filed: May 8, 2018

(65) Prior Publication Data

US 2019/0093520 A1 Mar. 28, 2019

Related U.S. Application Data

(60) Provisional application No. 62/562,017, filed on Sep. 22, 2017.

(51) Int. Cl.
*F02G 5/02* (2006.01)
*F01K 23/10* (2006.01)
(Continued)

(52) U.S. Cl.
CPC ............ *F01K 23/101* (2013.01); *B60K 13/04* (2013.01); *F01K 9/003* (2013.01); *F01K 13/02* (2013.01);
(Continued)

(58) Field of Classification Search
CPC ...... F01K 23/10; F01K 23/101; F01K 23/065; F01K 9/003; F02G 5/02
See application file for complete search history.

(56) References Cited

U.S. PATENT DOCUMENTS 3,512,358 A * 5/1970 Schmidt .................... F02C 9/24
60/659
6,910,333 B2 6/2005 Minemi et al.
(Continued)

FOREIGN PATENT DOCUMENTS

AT 507096 A4 2/2010
DE 102009028467 A1 2/2011
(Continued)

OTHER PUBLICATIONS

International Search Report, dated Nov. 23, 2018, corresponding to PCT/IB2018/056603, ISA/EPO.
(Continued)

*Primary Examiner* — Ngoc T Nguyen
(74) *Attorney, Agent, or Firm* — Harness, Dickey & Pierce, P.L.C.

(57) ABSTRACT

A power pack for converting waste heat from exhaust gases of an internal combustion engine to electrical energy includes a working fluid loop fluidly connecting an evaporator, an expander, a condenser and a pump. The power pack also includes a working fluid tank fluidly connected to the working fluid loop between an outlet of the condenser and an inlet of the pump. The working fluid tank has a single working fluid port operable to receive working fluid from the outlet of the condenser and to supply working fluid to the inlet of the pump. The power pack also includes a power pack control unit in communication with the working fluid tank. The power pack control unit is operable to change a pressure of the working fluid in the working fluid loop at the inlet of the pump by changing the pressure of the working fluid in the working fluid tank.

19 Claims, 6 Drawing Sheets

(51) Int. Cl.
| | |
|---|---|
| *F01N 3/00* | (2006.01) |
| *F01P 3/12* | (2006.01) |
| *F01K 13/02* | (2006.01) |
| *F01P 3/20* | (2006.01) |
| *F01K 9/00* | (2006.01) |
| *F01N 13/00* | (2010.01) |
| *B60K 13/04* | (2006.01) |
| *F01K 23/06* | (2006.01) |
| *F01N 3/04* | (2006.01) |
| *F01N 5/02* | (2006.01) |
| *F01N 5/04* | (2006.01) |
| *F01P 5/10* | (2006.01) |
| *F01P 7/16* | (2006.01) |
| *F01P 11/16* | (2006.01) |
| *F01P 11/18* | (2006.01) |
| *F01N 3/021* | (2006.01) |
| *F01N 3/08* | (2006.01) |
| *F01N 3/035* | (2006.01) |
| *F01N 3/10* | (2006.01) |
| *F01N 9/00* | (2006.01) |
| *F01N 3/20* | (2006.01) |
| *F01P 7/14* | (2006.01) |
| *F01K 15/02* | (2006.01) |

(52) U.S. Cl.
CPC ............ *F01K 23/065* (2013.01); *F01K 23/10* (2013.01); *F01N 3/005* (2013.01); *F01N 3/043* (2013.01); *F01N 5/02* (2013.01); *F01N 5/04* (2013.01); *F01N 13/00* (2013.01); *F01P 3/12* (2013.01); *F01P 3/20* (2013.01); *F01P 5/10* (2013.01); *F01P 7/161* (2013.01); *F01P 11/16* (2013.01); *F01P 11/18* (2013.01); *F02G 5/02* (2013.01); *B60Y 2200/142* (2013.01); *F01K 15/02* (2013.01); *F01N 3/021* (2013.01); *F01N 3/035* (2013.01); *F01N 3/0814* (2013.01); *F01N 3/0842* (2013.01); *F01N 3/0857* (2013.01); *F01N 3/101* (2013.01); *F01N 3/103* (2013.01); *F01N 3/106* (2013.01); *F01N 3/2066* (2013.01); *F01N 9/00* (2013.01); *F01N 13/009* (2014.06); *F01N 2240/02* (2013.01); *F01P 2007/146* (2013.01); *F01P 2025/08* (2013.01); *F01P 2060/14* (2013.01); *F02G 2254/15* (2013.01); *F02G 2280/50* (2013.01)

(56) References Cited

U.S. PATENT DOCUMENTS

| | | |
|---|---|---|
| 7,159,400 B2 | 1/2007 | Tsutsui et al. |
| 7,174,732 B2 | 2/2007 | Taniguchi et al. |
| 7,454,910 B2 | 11/2008 | Hamada et al. |
| 7,475,541 B2 | 1/2009 | Ibaraki et al. |
| 8,707,688 B2 | 4/2014 | Raab et al. |
| 8,752,378 B2 | 6/2014 | Ernst et al. |
| 8,985,066 B2 | 3/2015 | Lutz et al. |
| 9,334,760 B2 | 5/2016 | Ernst et al. |
| 9,494,055 B2 | 11/2016 | Rusche |
| 9,587,521 B2 | 3/2017 | Eybergen |
| 9,587,546 B2 | 3/2017 | Hussain et al. |
| 9,745,869 B2 | 8/2017 | Ernst et al. |
| 9,784,139 B2 | 10/2017 | Shaffer et al. |
| 10,240,488 B2 | 3/2019 | Irmler et al. |
| 10,316,726 B2 | 6/2019 | Jerges et al. |
| 2002/0007636 A1 | 1/2002 | Hay |
| 2005/0072170 A1 | 4/2005 | Taniguchi et al. |
| 2010/0037838 A1 | 2/2010 | Moench et al. |
| 2010/0156111 A1 | 6/2010 | Pesce et al. |
| 2011/0167818 A1* | 7/2011 | Tsuchino ............... F02G 5/02 60/618 |
| 2012/0159951 A1 | 6/2012 | Avery et al. |
| 2012/0198840 A1 | 8/2012 | Stegmaier et al. |
| 2013/0199178 A1 | 8/2013 | Kanou et al. |
| 2013/0327041 A1* | 12/2013 | Gaertner ............... F01K 13/02 60/618 |
| 2015/0068208 A1 | 3/2015 | Kosuda et al. |
| 2015/0121866 A1 | 5/2015 | Xia |
| 2015/0135708 A1* | 5/2015 | Lutz ..................... F01K 13/02 60/618 |
| 2016/0017973 A1* | 1/2016 | Steidten ............... F16H 13/06 475/33 |
| 2016/0186616 A1 | 6/2016 | Matsumoto et al. |
| 2016/0201519 A1 | 7/2016 | Zhou |
| 2016/0326981 A1 | 11/2016 | Kolb et al. |
| 2017/0067372 A1 | 3/2017 | Irmler et al. |
| 2018/0114890 A1 | 4/2018 | Chauvin |
| 2019/0128147 A1* | 5/2019 | Liu ....................... F01K 23/06 |

FOREIGN PATENT DOCUMENTS

| | | |
|---|---|---|
| DE | 102009050068 A1 | 4/2011 |
| DE | 102012209808 A1 | 12/2013 |
| DE | 102012209811 A1 | 12/2013 |
| DE | 102012209813 A1 | 12/2013 |
| DE | 102013021578 A1 | 7/2014 |
| DE | 102013211875 A1 | 1/2015 |
| DE | 102013222511 A1 | 5/2015 |
| DE | 102016012528 A1 | 4/2017 |
| DE | 102015224416 A1 | 6/2017 |
| EP | 2824300 A1 | 1/2015 |
| EP | 2933444 A1 | 10/2015 |
| EP | 3026246 A1 | 6/2016 |
| EP | 3098399 A1 | 11/2016 |
| JP | 2014190276 A * | 10/2014 |
| WO | 2014064484 A1 | 5/2014 |
| WO | 2016155705 A1 | 10/2016 |
| WO | 2017123132 A1 | 7/2017 |

OTHER PUBLICATIONS

Horst, Tilmann Abbe: "Betrieb eines rankine—prozesses zur abgaswarmenutzung im pkw", Jan. 1, 2015 (Jan. 1, 2015), XP055518930, Retrieved from the Internet: URL:http: / /ift -bs. de /images /Dokumente /horst_diss.pdf, (pp. 33-54) (pp. 55-58) (pp. 8, 34, pp. 55-59).

International Search Report, dated Nov. 26, 2018, corresponding to PCT/IB2018/056608, ISA/EPO.

International Search Report and Written Opinion, dated Nov. 23, 2018, corresponding to PCT/B2018/056607, ISA/EPO.

* cited by examiner

RANKINE POWER SYSTEM WITH WORKING FLUID TANK AND CONTROL SYSTEM

CROSS-REFERENCE TO RELATED APPLICATIONS

This application claims the benefit of U.S. Provisional Application No. 62/562,017 filed on Sep. 22, 2017. The entire disclosure of the above application is incorporated herein by reference.

FIELD

The present disclosure relates to a system that converts energy in form of heat within an exhaust system of an internal combustion engine to a more useful form of energy using the principles of a Rankine cycle.

BACKGROUND

This section provides background information related to the present disclosure and is not necessarily prior art.

Internal combustion engines often include an exhaust system that expels and treats the gases produced during the controlled combustion inside the engine. The gases that are produced during the controlled combustion are expelled at elevated temperatures. The energy associated with these heated gases is often transferred to the atmosphere resulting in inefficiencies in the internal combustion engine.

While diesel engines are known for being somewhat more efficient than other types of internal combustion engines, diesel engines also suffer from large inefficiencies that result from the expulsion of exhaust gases at elevated temperatures. The exhaust systems that are used in connection with diesel internal combustion engines often include aftertreatment systems that can contain a catalyst, a particulate filter and a deNox device to treat the gases expelled from the diesel internal combustion engine. After the expelled gases are treated, the gases remain at elevated temperatures. Instead of wasting the energy associated with the exhaust gases, the principles of the aforementioned Rankine cycle can be utilized to recover energy that can be used by various systems in the vehicle.

Known systems that attempt to recapture the energy associated with exhaust gases suffer from several disadvantages. Known systems are often bulky, complex and are difficult to integrate into existing vehicle systems. Known systems are also expensive, inefficient and difficult to service and maintain.

SUMMARY

This section provides a general summary of the disclosure, and is not a comprehensive disclosure of its full scope or all of its features.

In accordance with an aspect of the present disclosure, a power pack for converting waste heat from exhaust gases of an internal combustion engine to electrical energy includes a working fluid loop fluidly connecting an evaporator, an expander, a condenser and a pump. The working fluid loop contains a volume of working fluid wherein the evaporator is operable to place the working fluid in thermal communication with the exhaust gases of the internal combustion engine. The power pack also includes a working fluid tank that is fluidly connected to the working fluid loop between an outlet of the condenser and an inlet of the pump. The working fluid tank has a single working fluid port operable to receive working fluid from the outlet of the condenser and to supply working fluid to the inlet of the pump. The working fluid port is positioned at a height vertically above the inlet of the pump. The power pack also includes a power pack control unit in communication with the working fluid tank. The power pack control unit is operable to change a pressure of the working fluid in the working fluid loop at the inlet of the pump by changing the pressure of the working fluid in the working fluid tank.

In another aspect of the present disclosure, a power pack for converting waste heat from exhaust gases of an internal combustion engine to electrical energy includes a working fluid loop fluidly connecting an evaporator, an expander, a condenser and a pump. The working fluid loop contains a volume of working fluid, wherein the evaporator is operable to place the working fluid in thermal communication with the exhaust gases of the internal combustion engine and the condenser is operable to place the working fluid in thermal communication with a coolant flowing through the condenser. The power pack also includes a working fluid tank that is fluidly connected to the working fluid loop between an outlet of the condenser and an inlet of the pump. The working fluid tank includes a single working fluid port that is operable to receive working fluid from the outlet of the condenser and to supply working fluid to the inlet of the pump. The power pack also includes a power pack control unit in communication with the working fluid tank. The power pack control unit is operable to change a pressure of the working fluid in the working fluid loop at the inlet of the pump by changing the pressure of the working fluid in the working fluid tank based on a temperature of the coolant at a coolant inlet of the condenser.

In still another aspect of the present disclosure, a method of maintaining a minimum desirable pressure in a working fluid tank of a waste heat recovery power pack includes operating a pump to circulate a working fluid through a working fluid loop fluidly connecting the working fluid tank, the pump, an evaporator, an expander and a condenser. The method also includes receiving a signal indicative of a temperature of a coolant at a coolant inlet of the condenser of the waste heat recovery power pack, wherein the condenser places the coolant in thermal communication with the working fluid. The method includes comparing a pressure in the working fluid tank to a minimum desirable tank pressure, wherein the minimum desirable tank pressure is based on the temperature of the coolant at the coolant inlet. The method also includes adjusting the pressure in the tank to the minimum desirable tank pressure if the pressure in the working fluid tank is different from the minimum desirable tank pressure.

Other advantages and objects of the present disclosure will become apparent to those skilled in the art from the subsequent detailed description, appended claims and drawings. The description and specific examples in this summary are intended for purposes of illustration only and are not intended to limit the scope of the present disclosure.

BRIEF DESCRIPTION OF THE DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
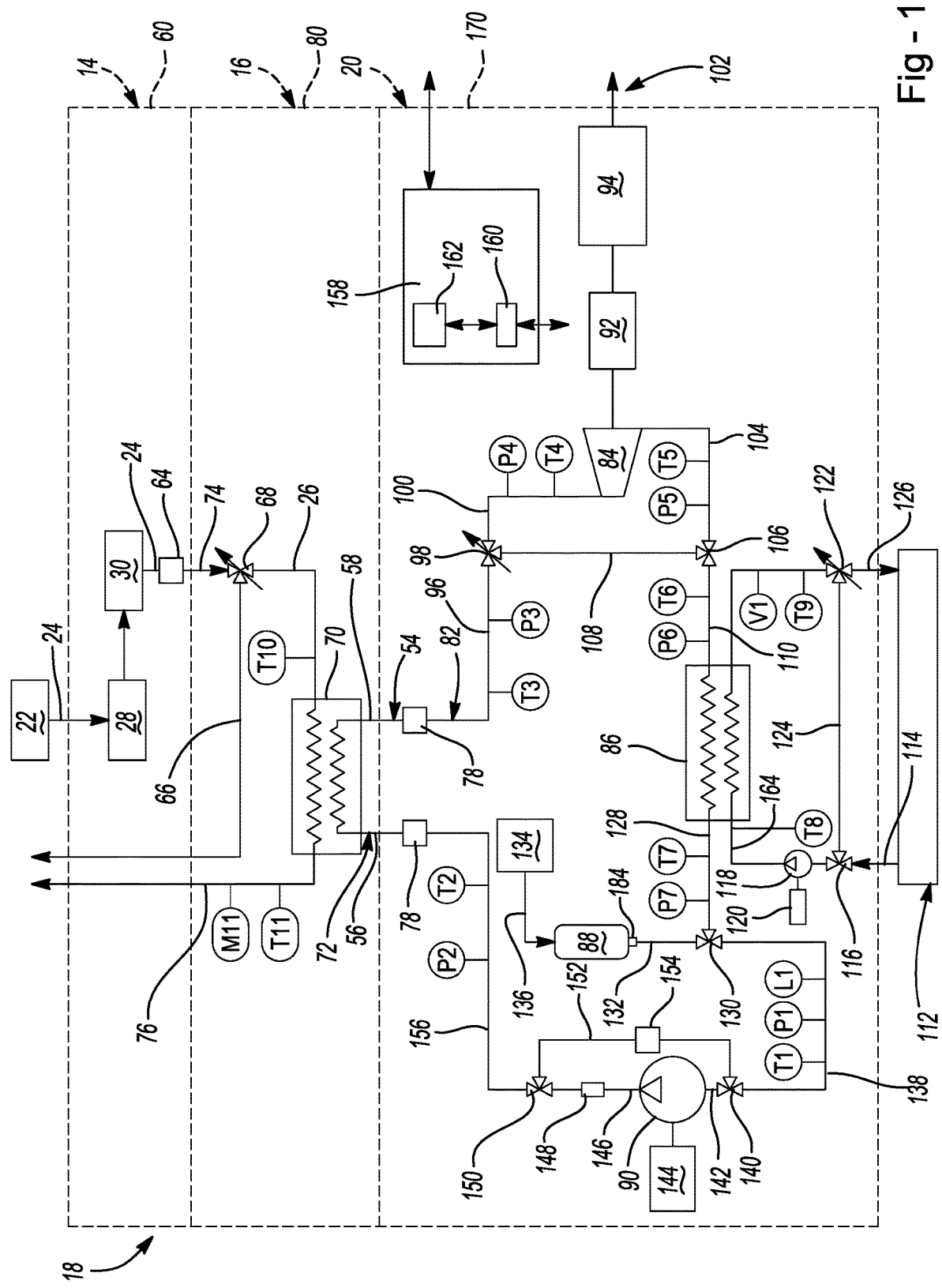
FIG. 1 is a block diagram showing one example power system in accordance with the present disclosure.

FIG. 1 illustrates an example embodiment of a power system 18 in accordance with the present disclosure. The power system 18 is a Rankine power system in that it utilizes the principles of the Rankine thermodynamic cycle to convert heat energy into mechanical energy during the phase change of a working fluid.

As shown in FIG. 1, the power system 18, in one example, includes an aftertreatment assembly 14, an evaporator assembly 16 and a power pack 20. The aftertreatment assembly 14, the evaporator assembly 16 and the power pack 20, as will be further explained below, are separate assemblies that can be easily joined together (and separated for service and/or maintenance) to convert heat from exhaust gases that are generated by an internal combustion engine to mechanical and/or electrical energy.

The power system 18 is an improvement over existing systems in that the aftertreatment assembly 14, the evaporator assembly 16 and the power pack 20 can be added to existing vehicles for the conversion of energy (in the form of heat) to mechanical and/or electrical energy. As will be further explained below, the aftertreatment assembly 14, the evaporator assembly 16 and/or the power pack 20 can be packaged in discrete, separable modular enclosures that can be added to existing vehicles. In addition, one or more of the aftertreatment assembly 14, the evaporator assembly 16 and the power pack 20 can be configured in different arrangements so as to be connected to vehicles that may be equipped with an existing aftertreatment assembly 14. The structure of the aftertreatment assembly 14, the evaporator assembly 16 and the power pack 20 result in a power system 18 that is easily installed, serviced and/or maintained in addition to converting waste heat energy into usable mechanical and/or electrical energy.

Figure 2:
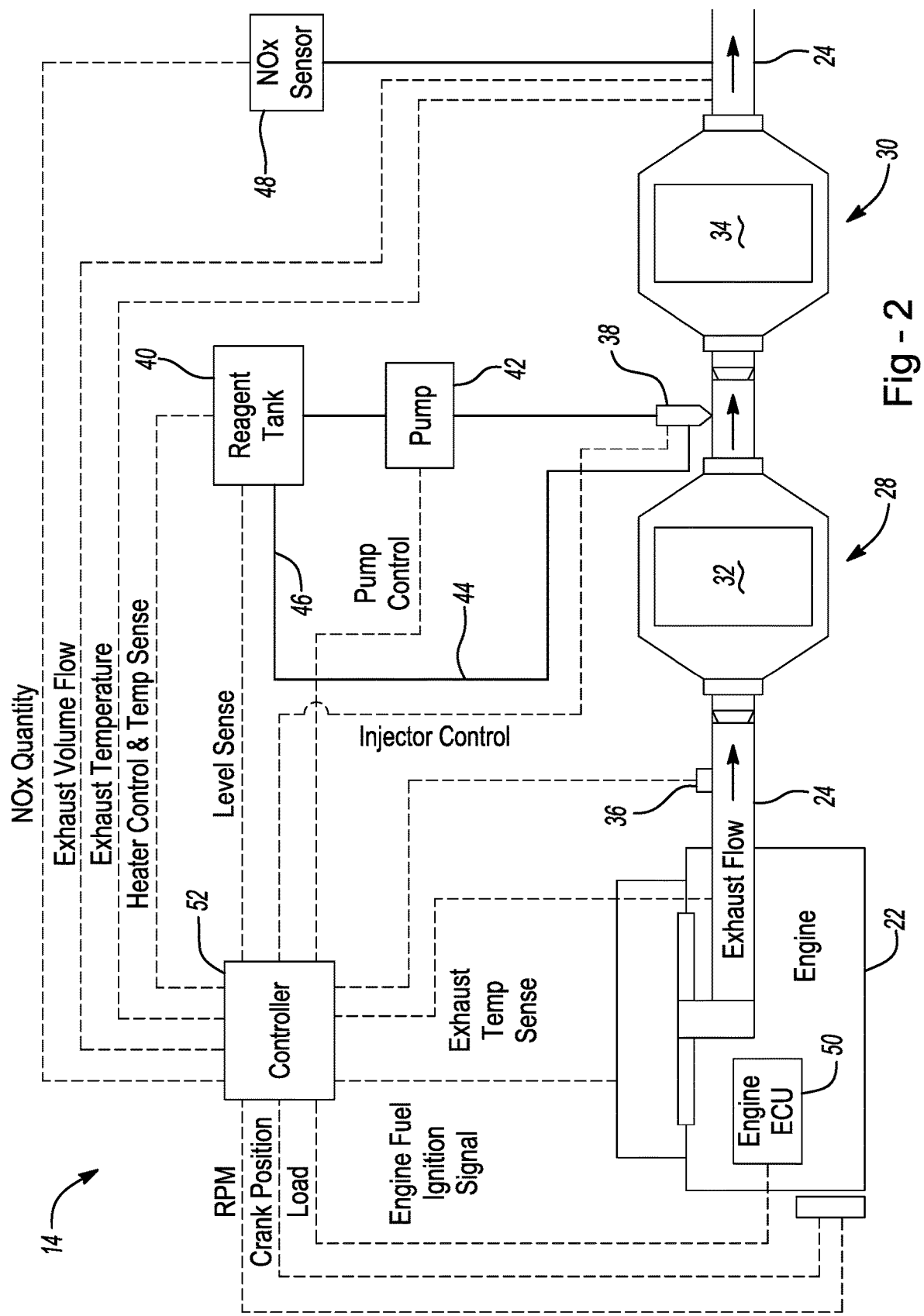
FIG. 2 is a schematic illustration of an example aftertreatment assembly used in the power system of FIG. 1.

Referring now to FIG. 2, the aftertreatment assembly 14 can include one or more devices used to reduce emissions produced by the internal combustion engine 22. FIG. 2 schematically illustrates an example aftertreatment assembly 14. The aftertreatment assembly 14 is positioned in communication with an internal combustion engine 22 that is in communication with a fuel source (not shown) that, once consumed, will produce exhaust gases that are discharged into an exhaust conduit 24. Downstream from the engine 22 can be disposed a pair of exhaust treatment components 28 and 30, which can include catalyst-coated substrates or filters 32 and 34. Catalyst-coated substrates or filters 32 and 34 can be any combination of a diesel particulate filter (DPF), a diesel oxidation catalyst (DOC) component, a selective catalytic reduction (SCR) component, a lean NOX catalyst, an ammonia slip catalyst, a catalyst-coated (e.g., SCR or DOC) DPF, NOX absorber, CO2 capture catalyst, or any other type or combination of exhaust treatment devices known to one skilled in the art.

Although not required by the present disclosure, the aftertreatment assembly 14 can further include components such as a thermal enhancement device or burner 36 to increase a temperature of the exhaust gases passing through exhaust conduit 24. Increasing the temperature of the exhaust gas is favorable to achieve light-off of the catalyst in the exhaust treatment component 28 in cold-weather conditions and upon start-up of engine 22, as well as initiate regeneration of the exhaust treatment component 28 when the exhaust treatment substrate 32 or 34 is a DPF. The thermal enhancement device or burner 36 can also be used to increase the temperature of the exhaust gas to achieve an improvement in the performance and/or efficiency of the power pack 20.

To assist in reduction of the emissions produced by engine 22, the aftertreatment assembly 14 can include a dosing module 38 for periodically dosing an exhaust treatment fluid into the exhaust stream. As illustrated in FIG. 2, the dosing module 38 can be located upstream of exhaust treatment component 28, and is operable to inject an exhaust treatment fluid into the exhaust stream. In this regard, the dosing module 38 is in fluid communication with a reagent tank 40 and a pump 42 by way of inlet line 44 to dose an exhaust treatment fluid such as diesel fuel or urea into the exhaust conduit 24 upstream of exhaust treatment components 28 and 30. Dosing module 38 can also be in communication with reagent tank 40 via return line 46. Return line 46 allows for any exhaust treatment fluid not dosed into the exhaust stream to be returned to reagent tank 40. Flow of the exhaust treatment fluid through inlet line 44, dosing module 38, and return line 46 also assists in cooling dosing module 38 so that dosing module 38 does not overheat. Although not illustrated in the drawings, dosing module 38 can be configured to include a cooling jacket that passes a coolant around dosing module 38 to cool it.

The amount of exhaust treatment fluid required to effectively treat the exhaust stream may vary with load, engine speed, exhaust gas temperature, exhaust gas flow, engine fuel injection timing, desired NOx reduction, barometric pressure, relative humidity, EGR rate and engine coolant temperature. A NOx sensor or meter 48 may be positioned downstream from exhaust treatment component 28. NOx sensor or meter 48 may also be positioned upstream or between the exhaust treatment components 28 and 30. NOx sensor 48 is operable to output a signal indicative of the exhaust NOx content to an engine control unit 50. NOx sensor or meter 48 may also be replaced by a particulate matter sensor. All or some of the engine operating parameters may be supplied from engine control unit 50 via the engine/vehicle databus to a reagent electronic dosing controller 52. The reagent electronic dosing controller 52 could also be included as part of the engine control unit 50. Exhaust gas temperature, exhaust gas flow and exhaust back pressure and other vehicle operating parameters may be measured by respective sensors, as indicated in FIG. 2.

As can be appreciated, not all the illustrated components are required nor may be included in the aftertreatment assembly 14. The type of the engine 22, the size of the vehicle, packaging restraints and other factors may vary the size and internal components of the aftertreatment assembly 14. Referring back to FIG. 1, the aftertreatment assembly 14 can be positioned inside a first housing 60. The first housing 60 may include a support structure and a first cover 62. As such and as will be further described below, the packaging of the aftertreatment assembly 14 in the first housing 60 can limit the size and quantity of aftertreatment components that are included in the aftertreatment assembly 14.

As shown in the example of FIG. 1, the aftertreatment assembly 14 includes the exhaust conduit 24 that permits exhaust gases to flow to the exhaust treatment components 28 and 30. After exiting the exhaust treatment components 28 and 30, the exhaust gases can flow to the evaporator assembly 16 through the exhaust conduit 24. The aftertreatment assembly 14 can include an exhaust service connector 64 that fluidly connects the exhaust conduit 24 to an evaporator assembly exhaust line 74. The exhaust service connector 64 may be positioned at any number of positions along the exhaust conduit 24, including at a position inside the evaporator assembly 16 rather than inside the aftertreatment assembly 14 as shown. The exhaust service connector 64 can be any suitable connector that permits the evaporator assembly exhaust line 74 to be easily connected (and disconnected) from the exhaust conduit 24 extending from the aftertreatment assembly 14. The exhaust service connector 64 can be a circumferential clamp that encircles the exhaust conduit 24 or the exhaust service connector 64 can include a pair of mating flanged fittings that are joined together using one or more fasteners, for example. The exhaust service connector 64 permits the evaporator assembly 16 to be coupled to the aftertreatment assembly 14 without the need for specialized tools such that the power system 18 can be easily installed, serviced and/or maintained.

Referring back to FIG. 1, the evaporator assembly 16 operates to place the exhaust gases flowing from the exhaust conduit 24 in thermal communication with a working fluid in the working fluid loop 54 inside an evaporator 70. The working fluid loop 54 includes a first portion 72 and a second portion 82. The first portion 72 of the working fluid loop 54 is positioned inside the evaporator assembly 16 and is connected to a second portion 82 that is positioned inside the power pack 20. Together, the first portion 72 and the second portion 82 fluidly connect the various components of the power pack 20 (as will be further described below) in the closed working fluid loop 54.

As shown in FIG. 1, the evaporator assembly 16 can include an exhaust bypass 66, an exhaust bypass valve 68, the evaporator 70, and an exhaust outlet 76. The exhaust bypass 66 is a length of conduit that extends from the bypass valve 68 along a path outside of the evaporator 70 to the atmosphere. The bypass valve 68 is connected to the evaporator assembly exhaust line 74 and operates to selectively divert a portion of the exhaust gases through the exhaust bypass 66 rather than flowing to the evaporator 70 through an evaporator exhaust inlet 26. The bypass valve 68 can be a suitable control valve that is operatively coupled to a power pack control unit 158 (described further below) or to other control modules such as the engine control unit 50 (FIG. 2). The exhaust bypass 66 can be utilized to control operating conditions of the evaporator 70 and/or to control a temperature and/or pressure of the working fluid flowing out of the evaporator 70 at an evaporator outlet 58.

The exhaust gases that are not diverted through the exhaust bypass 66 are routed through the evaporator 70 via the evaporator exhaust inlet 26. The exhaust gases can then exit the evaporator 70 through the exhaust outlet 76 and be emitted to the atmosphere. As can be appreciated, a suitable plenum or other exhaust mixing chamber can be included in the evaporator assembly 16 or downstream of the evaporator assembly 16 to combine the exhaust gases in the exhaust outlet 76 and from the exhaust bypass 66 before or after the exhaust gases exit the evaporator assembly 16 and are emitted to the atmosphere.

As further shown, the evaporator assembly 16 can also include one or more temperature sensors T10, T11 and/or a mass flow sensor M11. In the example shown, the temperature sensor T10 is positioned in the evaporator exhaust inlet 26. The temperature sensor T11 and the mass flow sensor M11 are positioned in the exhaust outlet 76. The temperature sensors T10, T11 and the mass flow sensor M11 can be in communication with the power pack control unit 158 to monitor and/or control the operating parameters of the power system 18.

As further shown, the working fluid in the working fluid loop 54 flows through the evaporator 70 from an evaporator inlet 56 to the evaporator outlet 58. The evaporator 70 can be any suitable evaporator that places the exhaust gases in thermal communication with the working fluid of the working fluid loop 54. For example, the evaporator 70 can be a suitable fin and tube heat exchanger operable to cause heat transfer between the exhaust gases flowing from the evaporator exhaust inlet 26 to the exhaust outlet 76 and the working fluid flowing from the evaporator inlet 56 to the evaporator outlet 58.

The evaporator assembly 16 is positioned inside a second housing 80. The second housing 80 can include a support structure and a second cover. In the example shown in FIG. 1, the evaporator assembly 16 is positioned directly adjacent the aftertreatment assembly 14. As will be described further below, the second housing 80 is sized and configured to mount directly to the aftertreatment assembly 14. As can be appreciated, the second housing 80 can be sized such that when the second housing 80 is mounted to the first housing 60, the exhaust conduit 24 is aligned with the service connector 64 such that the exhaust conduit 24 can be easily connected (or disconnected) during installation, service and/or maintenance.

As further shown in FIG. 1, the power pack 20 is positioned directly adjacent the evaporator assembly 16 on a side of the evaporator assembly 16 opposite to the aftertreatment assembly 14. In this position, the second portion 82 of the working fluid loop 54 can be connected to the first portion 72 of the working fluid loop 54 via two working fluid loop service connectors 78. When connected, the first portion 72 and the second portion 82 of the working fluid loop 54 define a closed loop in which a working fluid can be transmitted between the components of the power pack 20. The service connectors 78 can be any suitable sealing connectors such as so-called "quick" connectors, longitudinal connectors, threaded connectors, compression connectors or the like. The service connectors 78 can enable the second portion 82 of the working fluid loop 54 to be connected to the first portion 72 of the working fluid loop 54 without the need for specialized tools such that the power pack 20 can be connected or disconnected from the evaporator assembly 16 during installation, service or maintenance.

As shown, the power pack 20 may include an expander 84, a condenser 86, a tank (or accumulator) 88 and a pump 90. The second portion 82 of the working fluid loop 54 fluidly connects the aforementioned components of the power pack 20. As shown, an evaporator line 96 is fluidly connected to the evaporator outlet 58 by the service connector 78. The evaporator line 96 is also connected to an expander control valve 98. An expander inlet line 100 connects the expander control valve 98 to the expander 84.

Any suitable expander 84, such as a turbine, reciprocal, Wankel or helical expander, can be used. As the working fluid moves through the expander 84, one or more elements of the expander 84 rotates. This rotational movement (or mechanical energy) can then be converted into electrical energy by a generator 92. The generator 92 can be connected to a battery 94. The battery 94 can store the electrical energy produced by the generator 92 and use the electrical energy for subsequent use at the output 102 of the battery 94. In the example shown, the battery 94 is shown as located inside the power pack 20. In other examples the generator 92 can be coupled to a battery 94 that is positioned remote from the power pack 20.

The working fluid loop 54 continues from the expander 84 along the expander outlet line 104 to a condenser mixing valve 106. As shown, the power pack 20 can include an expander bypass 108. The expander bypass 108 fluidly connects the expander control valve 98 to the condenser mixing valve 106. As can be appreciated, the expander control valve 98 can operate to selectively cause all or some of the working fluid to flow through the expander bypass 108 instead of flowing through the expander 84. The volume of working fluid that is diverted through the expander bypass 108 can mix with the volume of working fluid that passed through the expander 84 in the condenser mixing valve 106. The working fluid can then flow from the condenser mixing valve 106 into the condenser 86 in a condenser inlet line 110.

The condenser 86 can be any suitable condenser that permits heat transfer between a coolant in a cooling system 112 and the working fluid passing through the condenser 86. As such, the working fluid in the working fluid loop 54 is in thermal communication with the coolant in the cooling system 112. The cooling system 112 can be a vehicle cooling system that includes a radiator and permits the coolant to flow through and cool the engine 22.

The coolant from the cooling system 112 moves into the power pack 20 through coolant input 114. As shown in FIG. 1, the power pack 20 can include a coolant input mixing valve 116 and a coolant pump 118 coupled to a drive motor 120. The power pack 20 can also include a coolant control valve 122 and a coolant bypass 124. The coolant control valve 122 can selectively divert a portion of the volume of coolant flowing out of the condenser 86 through the coolant outlet 126 through the coolant bypass 124 instead of permitting the coolant to pass out of the power pack 20 and back into the cooling system 112. The coolant pump 118 is coupled to the drive motor 120. The drive motor 120 (or the coolant pump 118) can be in communication with the power pack control unit 158. The power pack control unit 158 can variably control the coolant pump 118 to cause the coolant to flow into the condenser 86 at a predetermined set of operating parameters.

The working fluid loop 54 continues at the condenser outlet line 128 at which the working fluid leaves the condenser 86. The condenser outlet line 128 connects the condenser 86 to the tank mixing valve 130. The tank 88 is connected to the tank mixing valve 130 by the tank connecting line 132. The tank 88 can be any suitable expansion tank or other accumulator. The tank 88 can include a pressure sensor that is in communication with the power pack control unit 158. As such, the power pack control unit 158 can determine the pressure in the tank 88. As will be explained further described below, the power pack control unit 158 can monitor the pressure in the tank 88 and maintain the pressure in the tank at a minimum desirable tank pressure in order to maximize the efficiency of the power pack 20.

The tank 88, in the example shown, is connected to a pressurized fluid source 134. In the example shown, the pressurized fluid source 134 can be a dedicated compressor assembly that is included in the power pack 20 and supplies pressurized fluid only to the tank 88. In other examples, the pressurized fluid source 134 can be located remotely from the power pack 20 and be coupled to the tank 88 by a pressurized fluid line 136. For example, a remotely located pressurized fluid source 134 can be a separate compressor assembly used to supply pressurized air to a brake system or other pneumatic system of the vehicle.

As shown, the tank 88 includes a single inlet/outlet (or working fluid port) 184 at tank connecting line 132. The tank connecting line 132 permits working fluid to flow into the tank 88 and to flow from the tank 88. The tank connecting line is connected to the tank mixing valve 130 to fluidly connect the tank 88 to both the condenser outlet line 128 and to the pump connecting line 138.

The pump connecting line 138 connects the tank mixing valve 130 to the pump inlet mixing valve 140. The pump inlet mixing valve 140 is also connected to the pump inlet line 142. The pump inlet line 142 connects the working fluid loop 54 to the pump 42. The pump 42 can be any suitable pump for moving or pressurizing the working fluid in the power pack 20. The pump 42, for example, can be a reciprocating pump, a gear pump, a vane pump or a membrane pump. The pump 42 can be coupled to a pump motor 144. As can be appreciated, the pump motor 144 can be in communication with the power pack control unit 158. The power pack control unit 158 can cause the pump 42 to change the operating parameters (e.g., temperature, pressure, flow rate, etc.) of the power pack 20.

The working fluid leaves the pump 42 through the pump outlet line 146. The pump outlet line 146 can include a filter 148 that can remove contaminants or other particulate matter from the working fluid. The pump outlet line 146 connects the pump 42 to the pump relief mixing valve 150. A relief line 152 with a pressure relief valve 154 is positioned in parallel with the pump 42. As can be appreciated, the pressure relief valve 154 can open to when a predetermined pressure level of the working fluid is reached to prevent damage to the pump 42 or to other components of the power pack 20.

An evaporator inlet line 156 is connected to the pressure relief valve 154 and connects the pump 42 to the evaporator 70. In this manner, the power pack 20 includes a closed loop through which the working fluid can travel to operate the Rankine cycle and convert the waste heat energy of the exhaust gases from the engine 22 into mechanical and/or electrical energy.

As can be appreciated, the working fluid in the previously described working fluid loop 54 has different operating parameters as it travels through the power pack 20. For example, the working fluid has a relatively high temperature in certain portions of the working fluid loop 54 and a relatively low temperature in other portions of the working fluid loop 54. The working fluid also can have a relatively high pressure in some portions of the working fluid loop 54 and a relatively low pressure in other portions of the working fluid loop 54. Under these conditions, the working fluid can undergo phase changes as it travels through the working fluid loop 54 and can operate in the liquid phase in some portions of the working fluid loop 54 and in the vapor phase in other portions of the working fluid loop 54. In the example shown, the working fluid operates as a relatively high pressure liquid when the working fluid exits the pump 42 and moves through the pump outlet line 146 and the evaporator inlet line 156. The working fluid can operate as a relatively low pressure liquid when the working fluid exits the condenser 86 and moves through the condenser outlet line 128, the tank connecting line 132, the pump connecting line 138 and the pump inlet line 142. The working fluid can operate as a relatively high pressure vapor when the working fluid exits the evaporator 70 and moves through the evaporator line 96, the expander inlet line 100 and the expander bypass 108. The working fluid can operate as a relatively low pressure vapor when the working fluid exits the expander 84 and moves through the expander outlet line 104 and the condenser inlet line 110.

As further shown in FIG. 1, the power pack 20 can include one or more sensors positioned in various locations in the working fluid loop 54. The sensors operate to indicate an operating parameter of the working fluid in the working fluid loop 54. As shown, a temperature sensor T1, a pressure sensor P1 and a level (or presence) sensor L1 can be positioned in communication with the pump connecting line 138 and can be operative to indicate a temperature, pressure and presence of the working fluid in the pump connecting line 138. A temperature sensor T2 and a pressure sensor P2 can be positioned in communication with the evaporator inlet line 156 and can be operative to indicate a temperature and pressure of the working fluid in the evaporator inlet line 156. A temperature sensor T3 and a pressure sensor P3 can be positioned in communication with the evaporator line 96 and can be operative to indicate a temperature and pressure of the working fluid in the evaporator inlet line 156. A temperature sensor T4 and a pressure sensor P4 can be positioned in communication with the expander inlet line 100 and can be operative to indicate a temperature and pressure of the working fluid in the expander inlet line 100. A temperature sensor T5 and a pressure sensor P5 can be positioned in communication with the expander outlet line 104 and can be operative to indicate a temperature and pressure of the working fluid in the expander outlet line 104. A temperature sensor T6 and a pressure sensor P6 can be positioned in communication with the condenser inlet line 110 and can be operative to indicate a temperature and pressure of the working fluid in the condenser inlet line 110. A temperature sensor T7 and a pressure sensor P7 can be positioned in communication with the condenser outlet line 128 and can be operative to indicate a temperature and pressure of the working fluid in the condenser outlet line 128. A temperature sensor T8 can be positioned in communication with the coolant input 114 and can be operative to indicate a temperature of the coolant in the coolant input 114. A temperature sensor T9 and a volume flow sensor V1 can be positioned in communication with the coolant outlet 126 and can be operative to indicate a temperature and volumetric flow of the coolant in the coolant outlet 126.

The aforementioned sensors can be any suitable sensors known to one of ordinary skill in the art. The sensors can also be coupled to the power pack control unit 158 via an information bus 160. Such an information bus 160 can collect and transmit information indicative of the temperature, pressure, flow, presence or other information to the power pack control unit 158. The power pack control unit 158 may also be operatively coupled (for example, via wired or wireless communication) with the expander control valve 98, the coolant control valve 122, the drive motor 120, the bypass valve 68, the generator 92, the tank 88, the pressurized fluid source 134 and/or the pump motor 144. In response to receiving information indicative of the operating parameters of the working fluid from the sensors, the power pack control unit 158 can cause working fluid to be diverted by one or more of the control valves, the air pressure in the tank 88 to changed, the coolant pump 118 to be driven in a different manner and/or the pump 90 to be driven in a different manner to change the operating parameters of the working fluid to achieve a predetermined efficiency of the power pack and/or to prevent damage to the power pack 20.

The power pack control unit 158 can be connected to elements that are external to the power pack 20. While not shown in this example, the power pack control unit 158 can be connected to an engine management system (EMS) and/or to a vehicle electronic control unit (VECU). The power pack control unit 158 can be connected to the engine management system of a vehicle. In this manner, the power pack control unit 158 can send and receive signal to and from the engine management system so that the operation of the power system 18 is coordinated with the operation of the vehicle. The power pack control unit 158 can receive data from the engine management system such as the various operating parameters of the engine 22.

The power pack control unit 158 can include a suitable controller 162. In one example, the controller 162 can include a processor and non-transitory memory. The memory can have executable instructions, look-up tables and other suitable data that facilitates the operation of the power system 18. The controller 162 can include or be part of an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

Figure 3:
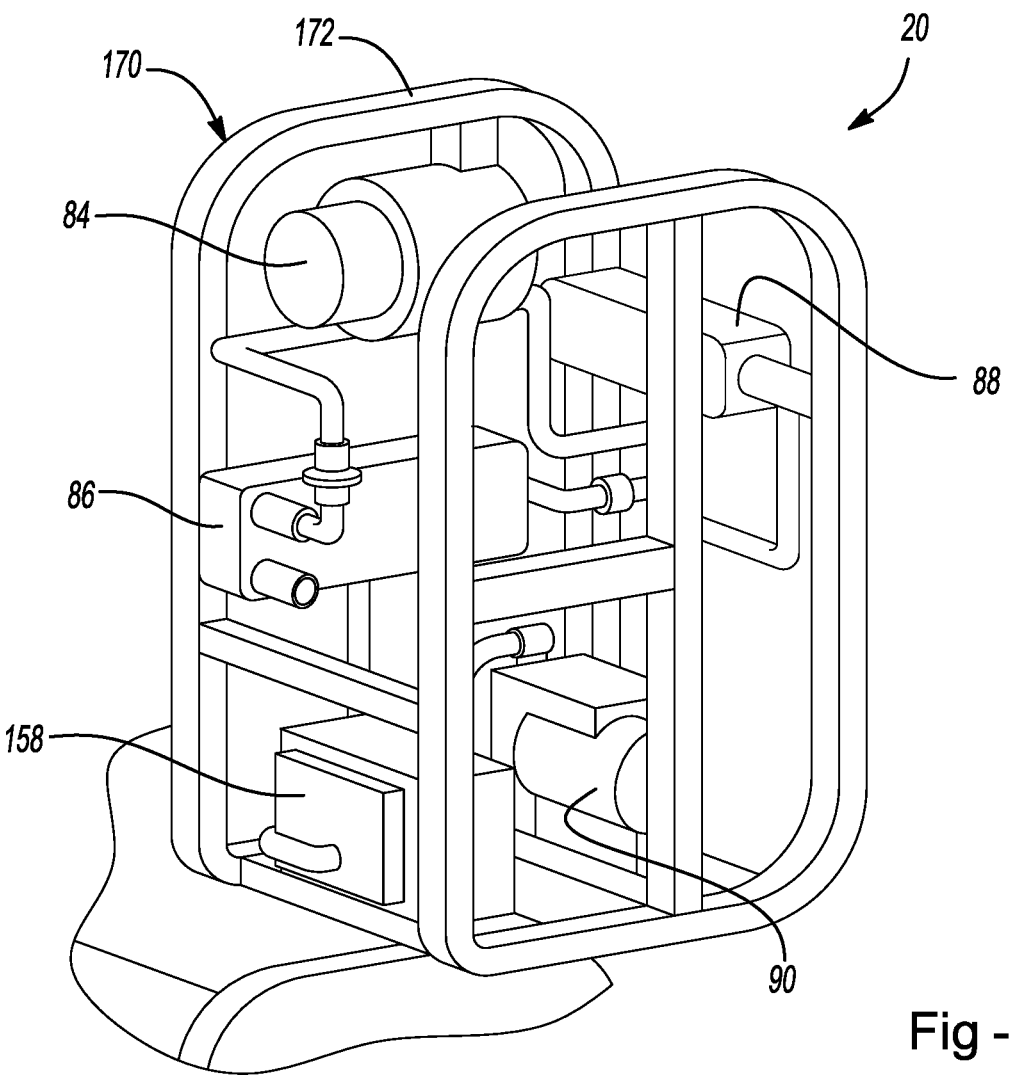
FIG. 3 is an illustration of an example power pack of the system of FIG. 1 shown with its cover removed.

FIG. 3 shows an example power pack 20. As shown, the power pack 20 includes the expander 84, the condenser 86, the power pack control unit 158, the tank 88 and the pump 90. These components are secured to a third housing 170. The third housing 170 can include a support structure 172 that is made of one or more structural members that create a frame around the power pack 20. For example, the support structure 172 can be made of tubular steel members formed into the shape as shown. In other examples, other suitable structural materials can be used. The support structure 172 can additionally include connection points through which fasteners can be used to secure the support structure to a vehicle. In other examples, support brackets (not shown) can project out from the support structure 172 and provide attachment surfaces for the attachment of the power pack 20 to a frame of a vehicle.

Figure 4:
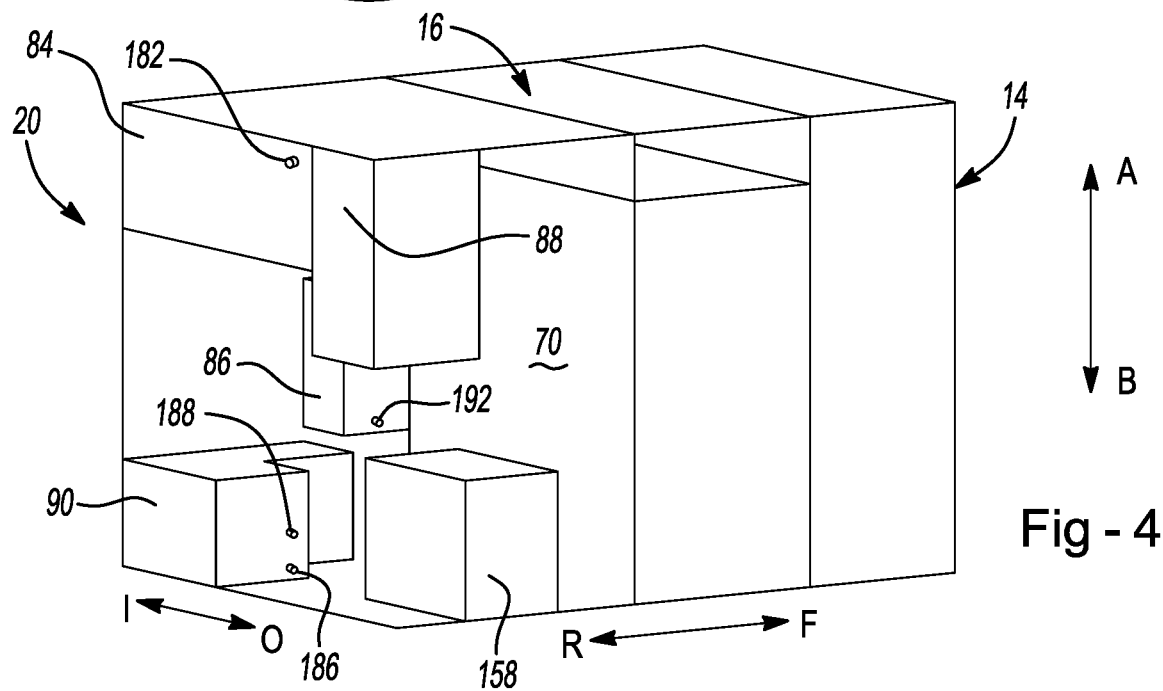
FIG. 4 is a block diagram showing an example configuration of a power pack of FIG. 1.
Figure 5:
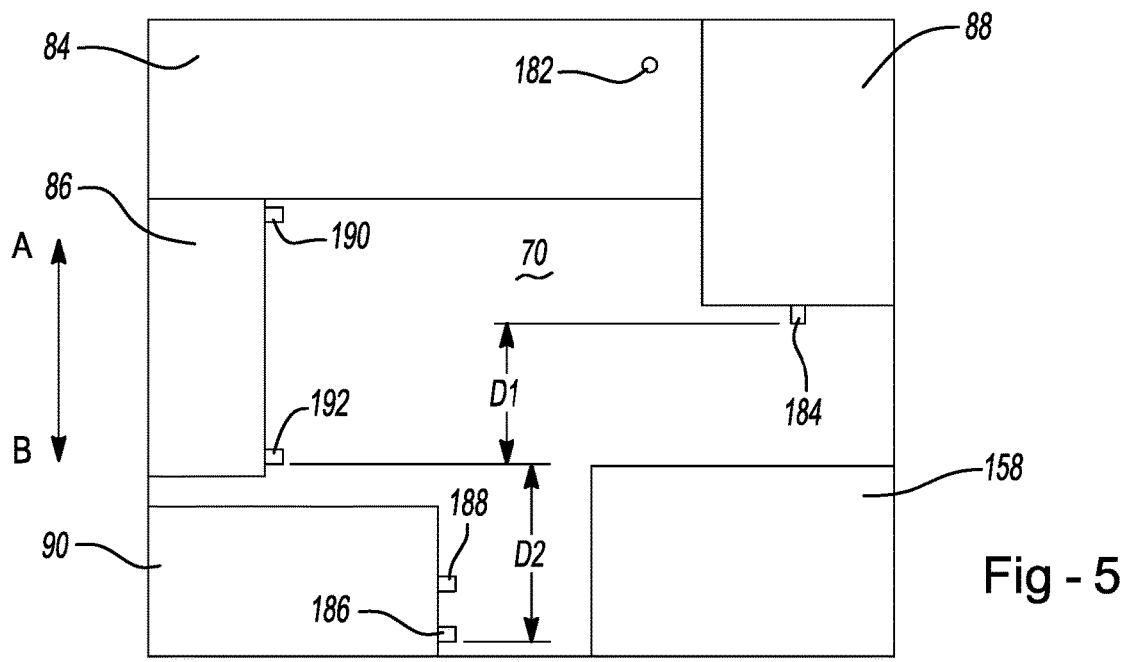
FIG. 5 is a rear view of the example configuration of the power pack shown in FIG. 4.
Figure 6:
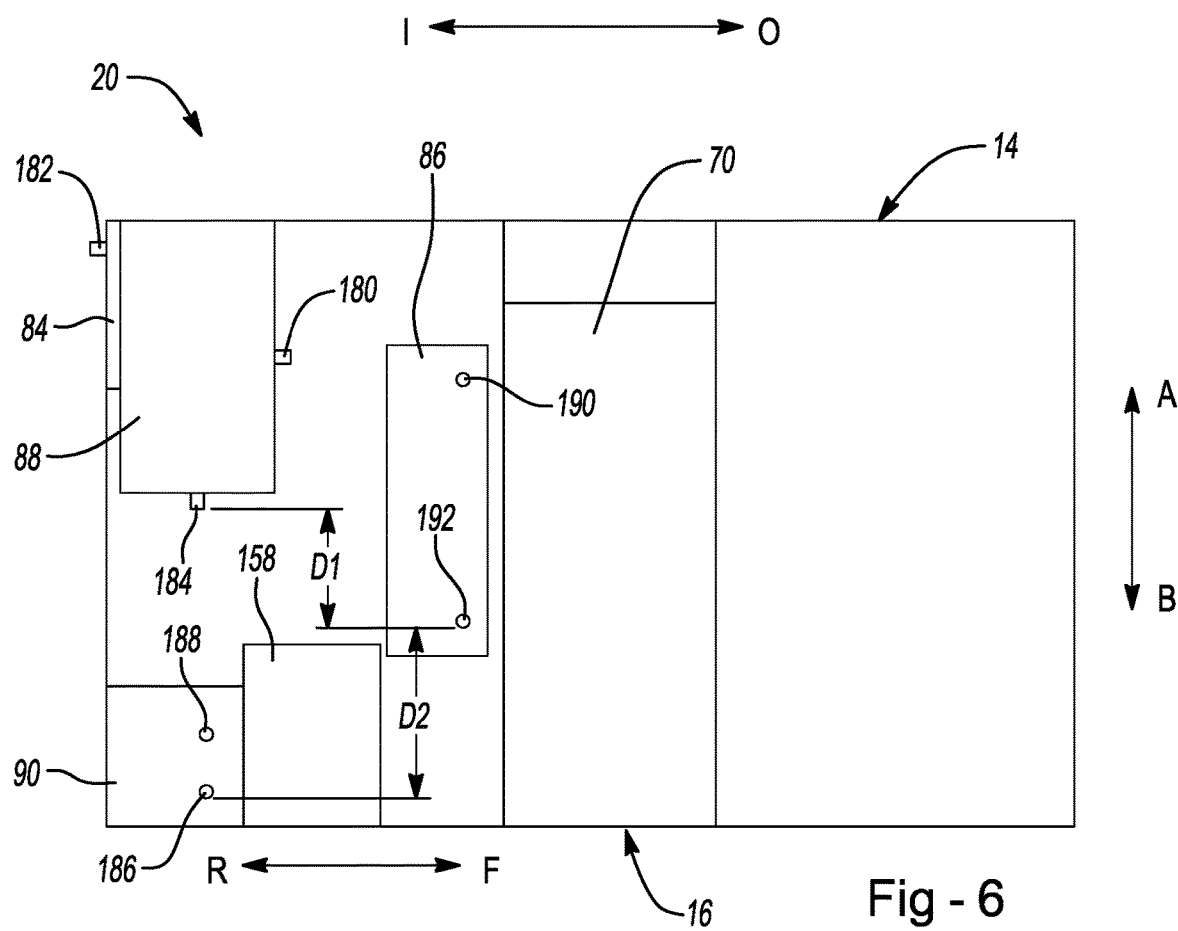
FIG. 6 is a side view of the example configuration of the power pack shown in FIG. 4.

Referring now to FIGS. 4-6, one example arrangement of the components of the power pack 20 is shown. FIGS. 4-6 are shown without the fluid lines of the working fluid loop 54 and are intended to show the relative positioning of the components of the power pack 20. In addition, the inlet and outlets to the various components of the power pack 20 may also be shown and are illustrative to show the relative positioning of such inlets and outlets. As can be appreciated, the fluid lines of the working fluid loop 54 that permit the working fluid to flow between the various components as described with respect to FIG. 1 can be connected between the various inlets and outlets shown.

In order to describe the relative positioning of the components of the power pack 20, the terms forward, rearward, inboard, outboard, above and below may be used. The terms forward and rearward, in the example shown, indicate a direction relative to a vehicle to which the power pack 20 is attached and are shown as forward F and rearward R on FIGS. 4-6. The terms inboard and outboard, in the example shown, indicate a direction generally perpendicular to the forward and rearward direction and are indicated as inboard I and outboard O on the arrows on FIGS. 4-6. The terms above and below generally indicate a vertical direction in the example shown and are indicated as above A and below B on the arrows on FIGS. 4-6. It should be appreciated, however, that the terms forward, rearward, inboard, outboard, above and below are used in the present disclosure to describe relative positioning and the components can be arranged with other relative positionings.

As shown in the example configuration of FIGS. 4-6, the power pack 20 includes the expander 84, the tank 88, the condenser 86, the pump 90 and the power pack control unit 158. The power pack 20 can be positioned adjacent to and rearward of the evaporator assembly 16 that includes the evaporator 70. The evaporator assembly 16 can be positioned adjacent to and rearward of the aftertreatment assembly 14. The expander 84 can include an expander outlet 180 and an expander inlet 182. The expander 84 can be positioned toward a top of the power pack 20 and be positioned above the pump 90 at an inboard and rearward side of the power pack 20. The tank 88 can include a single inlet/outlet (or port) 184. The tank 88, in the example shown, can be positioned at a rearward and outboard side of the power pack 20 with the inlet/outlet position on a downward-facing side of the tank 88. The tank 88 can be positioned vertically above the pump 90 and the power pack control unit 158 and be positioned adjacent to and outboard of the expander 84.

As further shown, the pump 90 can be positioned at an inboard and lower portion of the power pack 20. The pump 90 can include a pump inlet 186 and a pump outlet 188. The pump inlet 186 and the pump outlet 188 can be positioned on an outboard facing side of the pump 90 as shown. As stated above, the pump 90 can be positioned below the expander 84. The pump 90 can also be positioned vertically below and laterally offset from the tank 88. The pump 90 can be positioned vertically below and rearward of the condenser 86.

The condenser 86, in the example shown, is positioned adjacent to an inboard side of the power pack 20. The condenser 86 can also be positioned forward of and above the pump 90. The condenser 86 can include a condenser inlet 190 and a condenser outlet 192. The condenser inlet 190 and the condenser outlet 192 can be positioned on an outboard facing side of the condenser 86 as shown.

The power pack control unit 158 is positioned on an outboard side of the power pack 20 in the example shown. The power pack control unit 158 can be positioned vertically below the expander 84 and the tank 88. In addition, the power pack control unit 158 can be positioned outboard of the pump 90. As shown, the power pack control unit 158 can be spaced apart from the various components of the power pack 20 in effort to prevent the power pack control unit 158 from becoming overheated during operation. As can be seen, the power pack control unit 158 is spaced apart from the evaporator 70, the pump 90, the tank 88, the condenser 86 and the expander 84.

The above-described arrangement of the components of the power pack 20 advantageously contribute to the efficiency and reliability of the power pack 20. One such relationship that contributes to the efficient and reliable operation of the power pack 20 is the relationship between the tank 88, the condenser 86 and the pump 90. As shown, the single inlet/outlet 184 of the tank 88 is positioned above the condenser outlet 192 by a distance D1 (FIG. 5). In addition, the condenser outlet 192 is positioned above the pump inlet 186 by a distance D2. The distances D1 and D2 can be any suitable distance and in one example, are a distance greater than zero. In another example, the distances D1 and D2 are between 0 mm and 151 mm. In still another example, the distances D1 and D2 are greater than 50 mm.

The tank 88 is positioned above the condenser 86 and above the pump 90. The condenser outlet 192 is positioned above the pump inlet 186 to help ensure that the working fluid in the working fluid loop 54 is in the liquid phase when the working fluid enters the pump 90. This helps to prevent cavitation in the pump 90 and to improve the efficiency of the power pack 20.

The power pack control unit 158 can control the pressure in the tank 88 to maintain the working fluid in a subcooled liquid phase when the working fluid enters the pump 90. The power pack control unit 158 can also operate to maintain the tank pressure at a minimum desirable pressure to maximize the efficiency of the power pack 20. With reference back to FIG. 1 and as previously described, the power pack control unit 158 can be in communication with the tank 88 and/or the pressurized fluid source 134. As such, the power pack control unit 158 can adjust the pressure in the tank 88 by causing the pressurized fluid source 134 to add pressurized air to the tank 88 or by causing pressurized air to be released from the tank 88. This adjustment to the pressurized air in the tank 88 can cause the pressure of the working fluid in the tank 88 to increase or decrease accordingly.

The power pack control unit 158, as previously described, can also be in communication with the temperature sensor T1, the pressure sensor P1 and the level (or presence) sensor L1 that are positioned in the pump connecting line 138. The temperature sensor T1 is operable to output a signal that indicates the temperature of the working fluid in the pump connecting line 138 that flows to the pump inlet line 142. The pressure sensor P1 is operable to output a signal that indicates the pressure of the working fluid in the pump connecting line 138 that flows to the pump inlet line 142. The level sensor L1 is operable to output a signal that indicates whether the working fluid is present in the pump connecting line 138. The power pack control unit 158, as previously described, can also be in communication with the temperature sensor T8 that is positioned at the condenser inlet 164 of the condenser 86. The temperature sensor T8 is operable to output a signal that indicates the temperature of the coolant entering the condenser 86.

Figure 7:
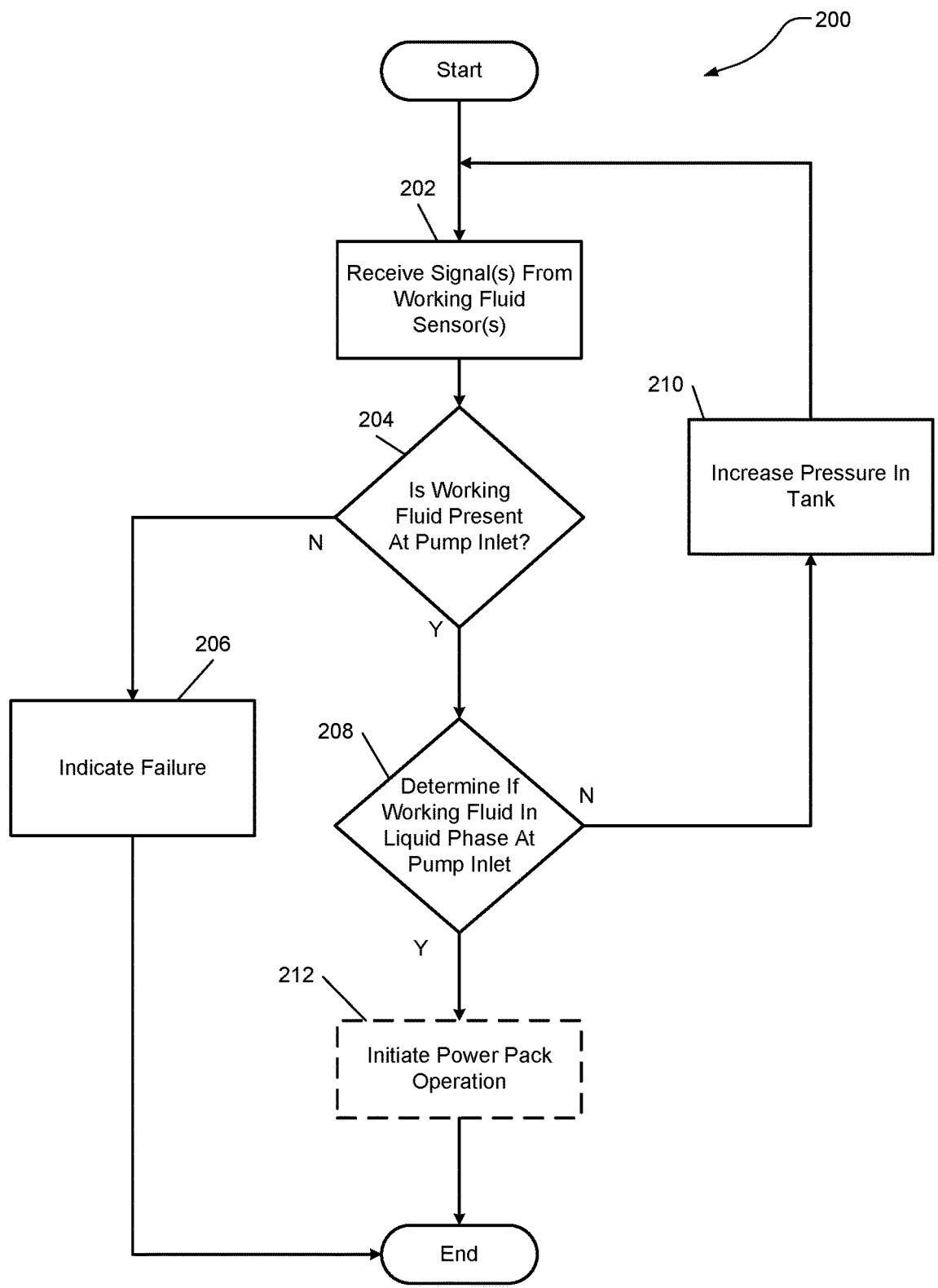
FIG. 7 is a flow chart showing one example method of maintaining a working fluid in a liquid phase at a pump inlet during operation of the power pack of FIG. 1.

FIG. 7 shows one example method 200 of maintaining the working fluid in a subcooled liquid phase at the pump inlet line 142. At step 232, the power pack control unit 158 receives the previously described signals from the various sensors of the power pack 20. For example, the power pack control unit 158 can receive signals from the temperature sensor T1, the pressure sensor P1 and the level sensor L1. At step 204, the power pack control unit 158 determines whether the working fluid is present at the pump inlet based on the signal received from the level sensor L1. If the power pack control unit 158 determines that the working fluid is present at the pump inlet, the method continues to step 208. If the power pack control unit 158 determines that the working fluid is not present at the pump inlet, the power pack control unit 158 indicates a failure at step 206. The power pack control unit 158 can indicate a failure by using any suitable indicator. For example, the power pack control unit can indicate a failure by causing an indicator light to illuminate or by sending a failure message (or other indicator) to the operator through a graphical user interface, a control panel or mobile computing device or the like.

At step 208, the power pack control unit 158 determines if the working fluid is in a liquid phase at the pump inlet. The power pack control unit 158 can determine if the working fluid is in a liquid phase at the pump inlet based on the signals received from the temperature sensor T1 and the pressure sensor P1. As can be appreciated, the power pack control unit 158 can use the temperature and pressure information from the signals of the temperature sensor T1 and the pressure sensor P1 to calculate or access an applicable look-up table to determine if the working fluid is in a liquid phase. If the power pack control unit 158 determines that the working fluid is not in a liquid phase, the power pack control unit 158 can increase the pressure in the tank 88 at step 210. As can be appreciated, the power pack control unit 158 can increase the pressure in the tank 88 by causing pressurized air to enter the tank 88 from the pressurized fluid source 134. The method then returns to step 202 whereby the power pack control unit 158 can repeat the steps 202 through 210 until the power pack control unit 158 determines that the working fluid is in a liquid phase at the pump inlet.

If the power pack control unit 158 determines that the working fluid is in a liquid phase, the method can continue to step 212 or can end. At step 212, the power pack control unit 158 can initiate operation of the power pack. Step 212 is applicable in instances in which the power pack 20 is being started. In circumstances in which the power pack 20 is already operating and will continue to operate, the power pack control unit 158 can repeat the method 200 to monitor whether the working fluid is in a liquid phase at the pump inlet. Otherwise, the method can end after step 212.

Figure 8:
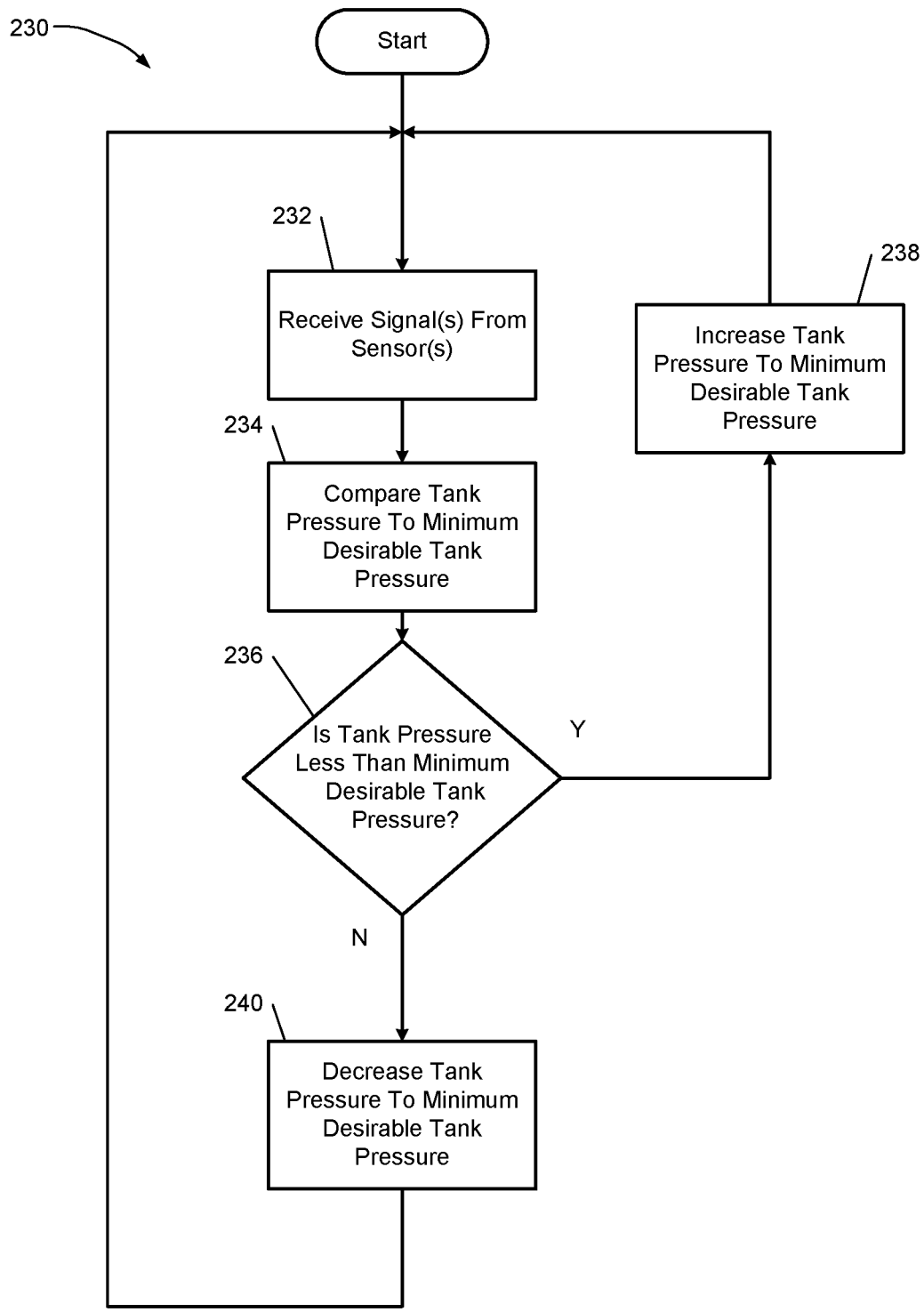
FIG. 8 is a flow chart showing one example method of maintaining a minimum desirable pressure in a tank of the power pack of FIG. 1.

In addition to monitoring whether the working fluid is in a liquid state, the power pack control unit 158 can maintain the pressure in the tank at a minimum desirable pressure. As such minimum desirable pressure, the efficiency of the power pack 20 can be maximized by maximizing the pressure ratio of the working fluid through the expander 84. One example method of maintaining the pressure in the tank 88 at a minimum desirable pressure is shown in FIG. 8. In the example method 230, the method begins at step 232. At step 232, the power pack control unit 158 can receive signals from various sensors of the power pack 20. For example, the power pack control unit 158 can receive signals from the tank 88 and the temperature sensor T8.

At step 234, the power pack control unit 158 can compare the tank pressure to a minimum desirable tank pressure. The minimum desirable tank pressure is a suitable tank pressure that maximizes the efficiency of the power pack 20. In one example, the minimum desirable tank pressure can be determined using the following formula:

$$P\text{min\_des} = \min[\max(P\text{sat}(T\text{coolant} + \text{tolerance}), P\text{tank\_min}), \text{ or } P\text{tank\_max}]$$

Psat=saturated vapor pressure of working fluid at corresponding temperature
Tcoolant=temperature of coolant at condenser inlet
Ptank_min=minimum allowable pressure in tank
Ptank_max=maximum allowable pressure in tank In the equation above, the Ptank_min and the Ptank_max are the minimum and maximum allowable pressures that are physically allowed according to the specifications of the tank 88. These values may vary depending on the tank 88 that is used. In one example, the minimum and maximum allowable pressures for the tank 88 are 1 bar and 3 bar, respectively. The minimum desirable tank pressure is also based on the temperature of the coolant at the condenser inlet. The power pack control unit 158 can determine the temperature of the coolant at the condenser inlet 164 from the signal received from the temperature sensor T8. The temperature of the coolant at the condenser inlet 164 is a practical input to use to determine the minimum desirable tank pressure because the temperature of the coolant is influenced by environmental parameters (e.g., ambient temperature) and operating conditions of a vehicle (e.g., vehicle speed, engine speed, etc.) to which the power pack 20 may be attached. By using the temperature of the coolant in the determination of the minimum desirable tank pressure, the method and operation of the power pack control unit 158 can be simplified. As can be appreciated, in other more complex methods, the power pack control unit 158 can receive signal(s) from other control unit (e.g., engine control unit 50) and/or other temperature or pressure sensors (e.g., T1 to T7, P1 to P7), to determine the minimum desirable tank pressure.

At step 234, the power pack control unit 158 can compare the actual tank pressure in the tank 88 to the minimum desirable tank pressure. At step 236, the power pack control unit 158 determines if the tank pressure is less than the minimum desirable tank pressure. If the tank pressure is less than the minimum desirable tank pressure the method proceeds to step 238. At step 238, the power pack control unit 158 can increase the tank pressure to the minimum desirable tank pressure. The power pack control unit 158 can increase the tank pressure by causing pressurized air to be introduced into the tank 88 from the pressurized fluid source 134. After the power pack control unit 158 increases the tank pressure to the minimum desirable tank pressure, the method returns to step 232. The method 230 can be repeated to maintain the tank pressure at the minimum desirable tank pressure.

If the power pack control unit 158 determines that the tank pressure is not less than the minimum desirable tank pressure, the method proceeds to step 240. At step 240, the power pack control unit 158 decreases the tank pressure to the minimum desirable tank pressure. The power pack control unit 158, for example, can decrease the tank pressure in the tank 88 by venting pressurized air from the tank 88.

After step 240, the method returns to step 232 to repeat the previously described steps. In this manner, the pressure in the tank 88 can be maintained at the minimum desirable pressure as operating and environmental conditions change so that the efficiency of the power pack 20 can be maximized.

While not shown in FIG. 8, the method 230 ends if the power pack control unit 158 determines that the power pack 20 is no longer operating. The power pack control unit 158 can receive a signal from a control device (e.g., the engine control unit 50 or a user input device) that indicates that the power is being powered off. At such time, the method 230 can cease operation.

Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly adjacent to," "directly connected to," or "directly coupled to" another element or layer, there may be no intervening elements or layers present. As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

What is claimed is:

1. A power pack for converting waste heat from exhaust gases of an internal combustion engine to electrical energy, the power pack comprising:
    a working fluid loop fluidly connecting an evaporator, an expander, a condenser and a pump, the working fluid loop containing a volume of working fluid wherein the evaporator is operable to place the working fluid in thermal communication with the exhaust gases of the internal combustion engine;
    a working fluid tank, the working fluid tank fluidly connected to the working fluid loop between an outlet of the condenser and an inlet of the pump, the working fluid tank having a single working fluid port, the working fluid port operable to receive working fluid from the outlet of the condenser and to supply working fluid to the inlet of the pump, the working fluid port positioned at a height vertically above the inlet of the pump; and
    a power pack control unit in communication with the working fluid tank, the power pack control unit operable to change a pressure of the working fluid in the working fluid tank to change a pressure of the working fluid in the working fluid loop at the inlet of the pump, wherein the power pack further comprises a level sensor located at the inlet of the pump, the level sensor operable to output a signal indicative of whether the working fluid is present at the inlet of the pump, wherein the power pack control unit is in communication with the level sensor and is operable to indicate a failure of the power pack when the signal from the level sensor indicates that the working fluid is not present at the inlet of the pump.

2. The power pack of claim 1 further comprising a pump inlet temperature sensor operable to output a signal indicative of a temperature of the working fluid at the inlet of the pump and a pump inlet pressure sensor operable to output a signal indicative of a pressure of the working fluid at the inlet of the pump, wherein the power pack control unit is in communication with the pump inlet temperature sensor and the pump inlet pressure sensor and is operable to increase the pressure of the working fluid in the working fluid tank when the signal from the pump inlet temperature sensor and the signal from the pump inlet pressure sensor indicate that the working fluid is in a vapor state at the inlet of the pump.

3. The power pack of claim 1 wherein the expander, the condenser, the pump, the working fluid tank and the power pack control unit are positioned inside a housing that is configured to connect to a frame of a vehicle.

4. The power pack of claim 1 wherein the outlet of the condenser is positioned vertically above the inlet of the pump.

5. The power pack of claim 1 wherein the expander is positioned vertically above the pump.

6. The power pack of claim 1 wherein the condenser is horizontally spaced apart from the expander and the pump and vertically positioned between the expander and the pump.

7. A power pack for converting waste heat from exhaust gases of an internal combustion engine to electrical energy, the power pack comprising:
    a working fluid loop fluidly connecting an evaporator, an expander, a condenser and a pump, the working fluid loop containing a volume of working fluid wherein the evaporator is operable to place the working fluid in thermal communication with the exhaust gases of the internal combustion engine;
    a working fluid tank, the working fluid tank fluidly connected to the working fluid loop between an outlet of the condenser and an inlet of the pump, the working fluid tank having a single working fluid port, the working fluid port operable to receive working fluid from the outlet of the condenser and to supply working fluid to the inlet of the pump, the working fluid port positioned at a height vertically above the inlet of the pump; and
    a power pack control unit in communication with the working fluid tank, the power pack control unit operable to change a pressure of the working fluid in the working fluid tank to change a pressure of the working fluid in the working fluid loop at the inlet of the pump, wherein the power pack further comprises a condenser inlet temperature sensor operable to output a signal indicative of a temperature of a coolant at a coolant inlet of the condenser, the condenser inlet temperature sensor in communication with the power pack control unit, wherein the power pack control unit is operable to adjust the pressure of the working fluid in the working fluid tank based on the temperature of the coolant at the coolant inlet of the condenser.

8. A power pack for converting waste heat from exhaust gases of an internal combustion engine to electrical energy, the power pack comprising:

a working fluid loop fluidly connecting an evaporator, an expander, a condenser and a pump, the working fluid loop containing a volume of working fluid wherein the evaporator is operable to place the working fluid in thermal communication with the exhaust gases of the internal combustion engine;

a working fluid tank, the working fluid tank fluidly connected to the working fluid loop between an outlet of the condenser and an inlet of the pump, the working fluid tank having a single working fluid port, the working fluid port operable to receive working fluid from the outlet of the condenser and to supply working fluid to the inlet of the pump, the working fluid port positioned at a height vertically above the inlet of the pump; and a power pack control unit in communication with the working fluid tank, the power pack control unit operable to change a pressure of the working fluid in the working fluid tank to change a pressure of the working fluid in the working fluid loop at the inlet of the pump, wherein the power pack further comprises a condenser inlet temperature sensor operable to output a signal indicative of a temperature of a coolant at a coolant inlet of the condenser, the condenser inlet temperature sensor in communication with the power pack control unit, wherein the power pack control unit is operable to increase the pressure of the working fluid in the working fluid tank to a minimum desirable tank pressure when the pressure of the working fluid in the working fluid tank is less than the minimum desirable tank pressure based on the signal from the condenser inlet temperature sensor.

9. A power pack for converting waste heat from exhaust gases of an internal combustion engine to electrical energy, the power pack comprising:

a working fluid loop fluidly connecting an evaporator, an expander, a condenser and a pump, the working fluid loop containing a volume of working fluid wherein the evaporator is operable to place the working fluid in thermal communication with the exhaust gases of the internal combustion engine;

a working fluid tank, the working fluid tank fluidly connected to the working fluid loop between an outlet of the condenser and an inlet of the pump, the working fluid tank having a single working fluid port, the working fluid port operable to receive working fluid from the outlet of the condenser and to supply working fluid to the inlet of the pump, the working fluid port positioned at a height vertically above the inlet of the pump; and a power pack control unit in communication with the working fluid tank, the power pack control unit operable to change a pressure of the working fluid in the working fluid tank to change a pressure of the working fluid in the working fluid loop at the inlet of the pump, wherein the power pack further comprises a condenser inlet temperature sensor operable to output a signal indicative of a temperature of a coolant at a coolant inlet of the condenser, the condenser inlet temperature sensor in communication with the power pack control unit, wherein the power pack control unit is operable to decrease the pressure of the working fluid to a minimum desirable tank pressure in the working fluid tank when the pressure of the working fluid in the working fluid tank is greater than a minimum desirable tank pressure based on the signal from the condenser inlet temperature sensor.

10. The power pack of claim 9 wherein the minimum desirable tank pressure is based on a temperature of the coolant at the inlet of the condenser indicated by the condenser inlet temperature sensor.

11. The power pack of claim 9 wherein the minimum desirable tank pressure is selected from a minimum of a saturated vapor pressure of the working fluid at the temperature of the coolant at the inlet of the condenser indicated by the condenser inlet temperature sensor and a maximum allowable pressure of the working fluid tank.

12. A power pack for converting waste heat from exhaust gases of an internal combustion engine to electrical energy, the power pack comprising:

a working fluid loop fluidly connecting an evaporator, an expander, a condenser and a pump, the working fluid loop containing a volume of working fluid wherein the evaporator is operable to place the working fluid in thermal communication with the exhaust gases of the internal combustion engine;

a working fluid tank, the working fluid tank fluidly connected to the working fluid loop between an outlet of the condenser and an inlet of the pump, the working fluid tank having a single working fluid port, the working fluid port operable to receive working fluid from the outlet of the condenser and to supply working fluid to the inlet of the pump, the working fluid port positioned at a height vertically above the inlet of the pump; and a power pack control unit in communication with the working fluid tank, the power pack control unit operable to change a pressure of the working fluid in the working fluid tank to change a pressure of the working fluid in the working fluid loop at the inlet of the pump, wherein the working fluid tank is connected to a dedicated compressor assembly that supplies a source of pressurized air only to the working fluid tank.

13. A power pack for converting waste heat from exhaust gases of an internal combustion engine to electrical energy, the power pack comprising:

a working fluid loop fluidly connecting an evaporator, an expander, a condenser and a pump, the working fluid loop containing a volume of working fluid, wherein the evaporator is operable to place the working fluid in thermal communication with the exhaust gases of the internal combustion engine and the condenser is operable to place the working fluid in thermal communication with a coolant flowing through the condenser;

a working fluid tank, the working fluid tank fluidly connected to the working fluid loop between an outlet of the condenser and an inlet of the pump, the working fluid tank having a single working fluid port, the working fluid port operable to receive working fluid from the outlet of the condenser and to supply working fluid to the inlet of the pump; and a power pack control unit in communication with the working fluid tank, the power pack control unit operable to change a pressure of the working fluid in the working fluid loop at the inlet of the pump by changing a pressure of the working fluid in the working fluid tank based on a temperature of the coolant at a coolant inlet of the condenser.

14. The power pack of claim 13 wherein the working fluid port of the working fluid tank is positioned vertically above inlet of the pump.

15. The power pack of claim 13 wherein the outlet of the condenser is positioned at a vertical distance in a range of 0 to 151 mm from the inlet of the pump.

16. A method of maintaining a minimum desirable pressure in a working fluid tank of a waste heat recovery power pack, the method comprising:
- operating a pump to circulate a working fluid through a working fluid loop fluidly connecting the working fluid tank, the pump, an evaporator, an expander and a condenser;
- receiving a signal indicative of a temperature of a coolant at a coolant inlet of the condenser of the waste heat recovery power pack, wherein the condenser places the coolant in thermal communication with the working fluid;
- comparing a pressure in the working fluid tank to a minimum desirable tank pressure, wherein the minimum desirable tank pressure is based on the temperature of the coolant at the coolant inlet; and
- adjusting the pressure in the tank to the minimum desirable tank pressure when the pressure in the working fluid tank is different from the minimum desirable tank pressure.

17. The method of claim 16 wherein the signal indicative of the temperature of the coolant at the coolant inlet of the condenser is received from a temperature sensor positioned at the coolant inlet of the condenser.

18. The method of claim 16 wherein the step of adjusting the pressure in the tank includes pressurizing the tank from a dedicated source of pressurized air when the pressure in the tank is less than the minimum desirable tank pressure.

19. The method of claim 16 wherein the minimum desirable tank pressure is further based on a saturated vapor pressure at the temperature of the coolant at the coolant inlet.

* * * * *